No. 889,623. PATENTED JUNE 2, 1908.
S. KNECHT.
ATTACHMENT FOR ICE PLOWS.
APPLICATION FILED JUNE 14, 1907.
3 SHEETS—SHEET 1.
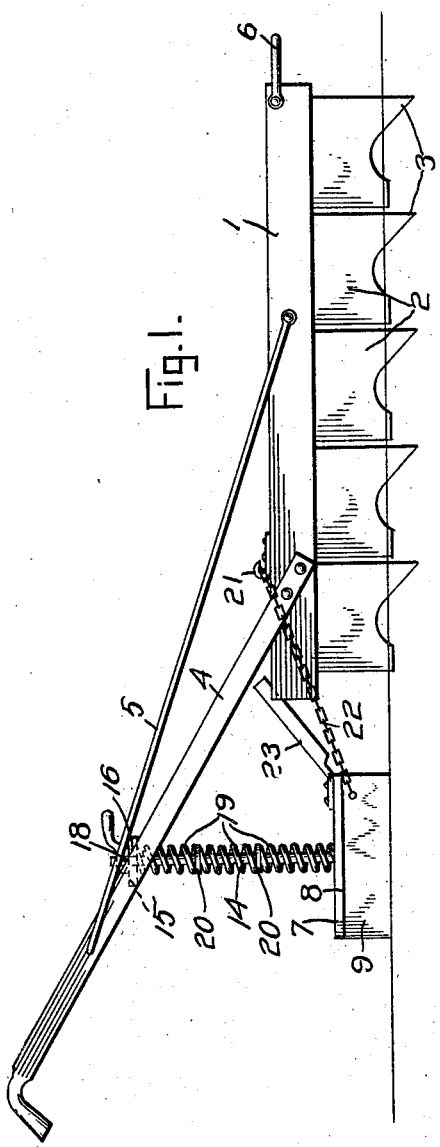
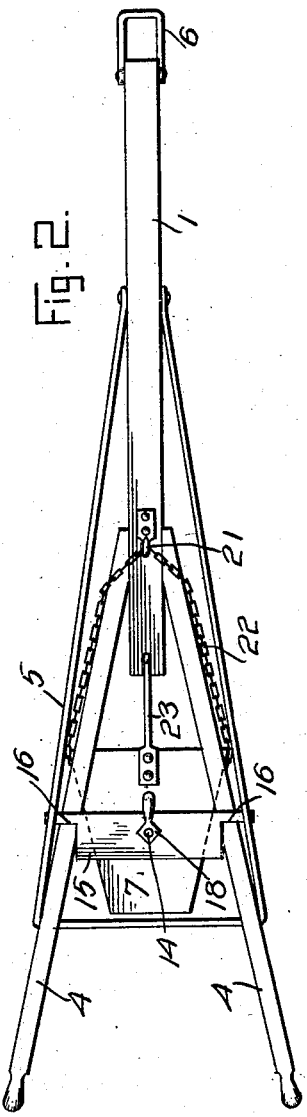
Witnesses
Inventor
Samuel Knecht.
Attorneys No. 889,623. PATENTED JUNE 2, 1908.
S. KNECHT.
ATTACHMENT FOR ICE PLOWS.
APPLICATION FILED JUNE 14, 1907.
3 SHEETS—SHEET 2.
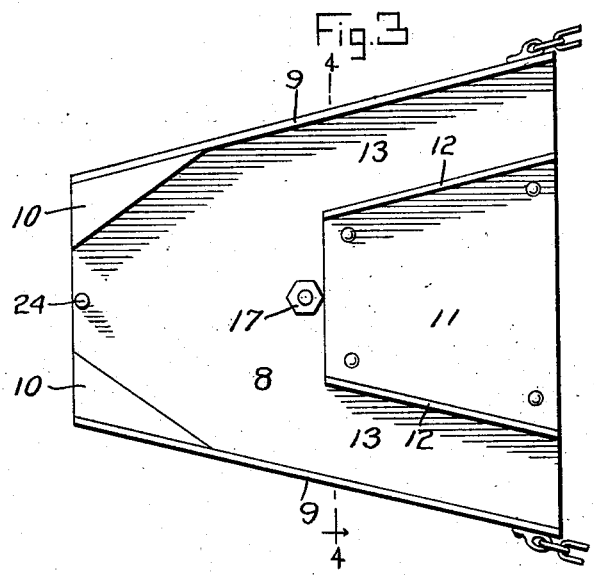
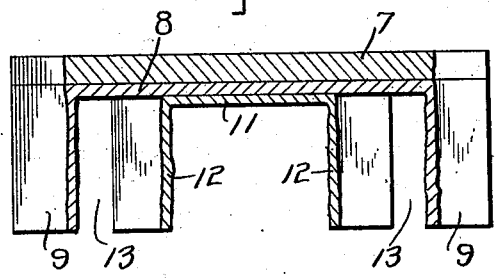
Witnesses
C. K. Reichenbach
H. McCartney
Inventor
Samuel Knecht.
By Chandler & Chandler
Attorneys.

No. 889,623. PATENTED JUNE 2, 1908.
S. KNECHT.
ATTACHMENT FOR ICE PLOWS.
APPLICATION FILED JUNE 14, 1907.
3 SHEETS—SHEET 3.
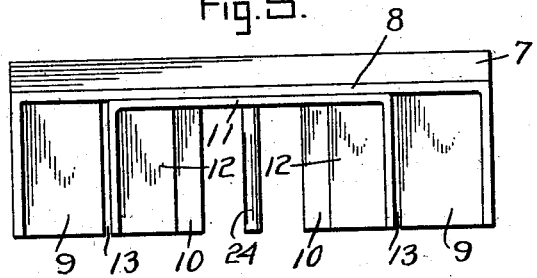
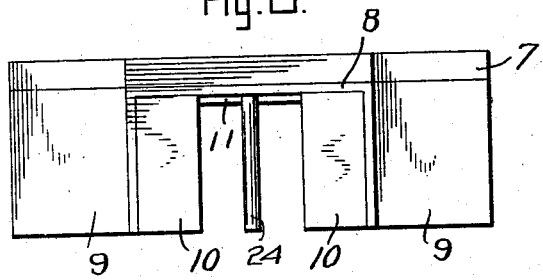
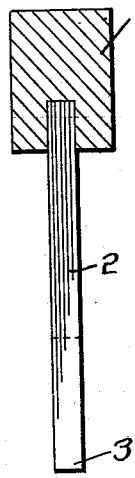

UNITED STATES PATENT OFFICE.

SAMUEL KNECHT, OF PETOSKEY, MICHIGAN.

ATTACHMENT FOR ICE-PLOWS.

No. 889,623.

Specification of Letters Patent.

Patented June 2, 1908.

Application filed June 14, 1907. Serial No. 378,988.

*To all whom it may concern:*

Be it known that I, SAMUEL KNECHT, a citizen of the United States, residing at Petoskey, in the county of Emmet, State of Michigan, have invented certain new and useful Improvements in Attachments for Ice-Plows; and I do hereby declare the following to be a full, clear, and exact description of the invention, such as will enable others skilled in the art to which it appertains to make and use the same.

The present invention has reference to attachments for ice-plows, and it aims to provide an exceedingly simple and inexpensive device which may be readily connected to an ice-plow for the purpose of filling the kerf cut by the plow with fine chips and shavings of ice, so as to prevent the rise of water through the kerf, the subsequent freezing of which would form a bond between the walls of the kerf sufficiently strong to prevent the squares of ice formed by intersecting kerfs from being readily broken apart from each other.

The invention further aims to provide such an attachment with means for leveling the filled kerf, so that its outline will be clearly visible.

With the above and other ends in view the invention consists in the construction, combination, and arrangement of parts, all as hereinafter fully described, specifically claimed, and illustrated in the accompanying drawings, in which like parts are designated by corresponding reference numerals in the several views.

Of the said drawings: Figure 1 is a side elevation of an ice-plow provided with the improved kerf-filling attachment. Fig. 2 is a top plan view thereof. Fig. 3 is a bottom plan view of the attachment. Fig. 4 is a transverse section on the line 4—4 of Fig. 3. Fig. 5 is a front view of the attachment. Fig. 6 is a rear view thereof. Fig. 7 is a transverse section through the plow.

Referring more particularly to the drawings, the numeral 1 designates the beam of the plow, in whose under face is formed a single longitudinal groove, or a series of alining longitudinal grooves, for the reception of the upper ends of the plow blades 2, each blade being provided with a cutting-tooth 3, located at its forward lower corner. It is to be understood, moreover, that the plow blades may be otherwise attached to the plow beam.

At its rear end the beam is provided with a pair of handles 4, and said handles are, in turn, braced by a U-shaped rod or bail 5, which extends rearwardly of the beam and is pivoted at its forward ends thereto, said bail being passed intermediate its ends through the handles, as shown. A clevis 6 is secured to the front end of the beam.

The kerf-filling attachment, which is disposed a slight distance beyond the rear end of the beam, and in a direct line therewith, consists of an upper plate 7, formed of wood, and a steel plate 8 secured to the under face thereof, the side edges, 9 of the steel plate being bent downwardly at right angles to the body portion thereof, so that the attachment may be regarded as U-shaped in cross-section. Both plates above referred to are rearwardly tapered, as shown, and the rear mouth of the attachment is further narrowed by means of a pair of oppositely-disposed wedge-shaped blocks 10 which are secured to the inner walls of the plate sides 9. The plate 8 is in turn provided with a steel plate 11 which is disposed against the under face of the body portion thereof, toward the front end thereof. The side edges 12 of the plate 11 are likewise downwardly bent, and are arranged in spaced relation to and parallel with the adjacent sides of plate 8, thus forming two channels 13 which lead toward the rear mouth of the attachment. The front edges of the sides 9 and 12 lie in the same vertical plane, while the rear edges of the under plate terminate a slight distance in advance of the front edges of the blocks 10.

The attachment is connected with the handles 4 by means of a vertical rod 14 whose upper end projects through an opening formed in a transversely arranged board 15 which is cut away at its rear corners to provide seats 16 in which the adjacent handles fit. The lower end of said rod extends through registering openings formed in the plates 7 and 8 and carries a nut 17 threaded on such projecting end, the upper end of the rod being likewise provided with a nut 18 which bears against the upper face of the board 15 and carries a wing or handle. Intermediate its ends the rod carries a series of expansible coil-springs 19 which are separated by washers 20, the tension of said springs holding the attachment yieldingly against the surface of the ice. The board 15 above referred to is further held against displacement by the passage of the arms of the bail 5 thereacross.

The plow beam carries upon its upper face a hook 21 which is disposed adjacent the rear end thereof and is adapted to engage the large central link of a chain 22 whose opposite ends are connected to the sides of the plate 8. The upper or wooden plate 7 has secured thereto a forwardly projecting guide rod 23 which extends across the rear end of the beam, as shown, said guide preventing any independent sidewise movement of the attachment.

While the exact dimensions of the attachment form no positive feature of the invention, it may be stated that the plates 7 and 8 are 12 inches wide at their front ends and 6 inches at their rear ends, and that the wedge-shaped blocks 10, whose rear ends are flush with the rear ends of the above-mentioned plates, are 2 inches wide at such point, thus leaving a space of about 2 inches between their mutually-adjacent rear edges.

It will be apparent that the fine chips and shavings of ice will be positively directed through separate channels into the kerf as the plow is drawn along the ice, and will fill the same, thus preventing the water from rising completely through and sealing the kerf, the fine shavings passing through the channels 13 between the adjacent sides 9 and 12 of the plates 8 and 11, and the chips, which are larger than the shavings and are therefore nearer the kerf, passing through the channels between the sides 12 of the last-mentioned plates. The provision of the two separate plates 9 and 11 not only results in the formation of the several channels above mentioned but also prevents to a great extent the opening at the rear end of the frame from becoming so packed as to render the filling of the kerf impossible.

The invention further contemplates the provision of means for leveling the ice shavings in the kerf, and to this end there is secured to the plate 8 a depending pin 24 which is located between the blocks 10 towards the rear ends thereof, in direct alinement with the kerf, said pin having a length approximately equal to the height of said blocks, so that its lower end will travel along the top of the kerf, thus leveling the shavings therein and compressing them to a slight degree.

The operation of the invention is thought to be apparent from the foregoing, and further description thereof is accordingly deemed unnecessary.

It will be obvious that the wooden plate 7 and the steel plate 8, constitute what may be regarded as the frame of the attachment, and, consequently, such term, which occurs in the following claims in connection with the attachment, has reference to said plates.

What is claimed, is:

1. The combination, with an ice-plow, its beam, and a pair of rearwardly extending handles secured to the beam, of a kerf-filling attachment carried by the beam and comprising a rearwardly-tapered open-ended frame having its sides arranged at right-angles to its body portion, to direct the ice shavings into the kerf cut by the plow, a pair of oppositely-disposed wedge-shaped blocks secured to the inner face of the frame sides, to partially close the opening in the rear end of the frame, means for yieldingly holding the frame against the ice, and means for preventing sidewise movement of the frame.

2. The combination with an ice-plow, its beam, and a pair of rearwardly extending handles secured to the beam, of a kerf-filling attachment carried by the beam and comprising a rearwardly-tapered open-ended frame having its sides arranged at right-angles to its body portion, to direct the ice shavings into the kerf cut by the ice-plow, a pair of oppositely disposed wedge-shaped blocks secured to the inner face of the frame sides, to partially close the opening in the rear end of the frame, a depending member secured to the body-portion of the frame between said blocks, to level the filled kerf, means for yieldingly holding the frame against the ice, and means for preventing sidewise movement of the frame.

3. The combination, with an ice-plow, its beam, and a pair of rearwardly extending handles secured to the beam, of a kerf-filling attachment carried by the beam and comprising a rearwardly-tapered open-ended frame having its sides arranged at right angles to the body portion, to direct the ice shavings into the kerf cut by the plow, a plate secured to the under face of the frame at the forward end thereof, said plate having depending sides arranged in spaced relation to and parallel with the adjacent sides of the frame, a pair of oppositely-disposed wedge-shaped blocks secured to the inner face of the frame sides rearwardly of said blocks, to partially close the opening in the rear end of the frame, means for yieldingly holding the frame against the surface of the ice, and means for preventing sidewise movement of the frame.

4. The combination, with an ice-plow, its beam, and a pair of rearwardly extending handles secured to the beam, of a transversely disposed board carried by the handles, and provided with a central opening, means for holding said board against displacement, a kerf-filling attachment comprising a rearwardly-tapered open-ended frame having its sides arranged at right-angles to its body portion, to direct the ice shavings into the kerf cut by the plow, the body portion of said frame having an opening formed therethrough in alinement with the first-mentioned opening, a vertical rod extending at opposite ends through said openings, resilient means carried by said rod and bearing at opposite ends against said board and the body portion of said frame, to yieldingly hold the frame against the surface of the ice, and means for preventing sidewise movement of said frame.

5. The combination with an ice-plow, its beam, and a pair of rearwardly extending handles secured to the beam, of a transversely disposed board carried by the handles and provided with a central opening, means for holding said board against displacement, a kerf-filling attachment comprising a rearwardly-tapered open-ended frame having its sides arranged at right-angles to its body portion, to direct the ice-shavings into the kerf cut by the plow, the body portion of the said frame having an opening formed therethrough in alinement with the first-mentioned opening, a vertical rod extending at opposite ends through said openings, resilient means carried by said rod and bearing at opposite ends against said board and the body portion of said frame, to yieldingly hold the frame against the surface of the ice, a pair of oppositely disposed wedge-shaped blocks secured to the inner face of the frame sides, to partially close the opening in the rear end of the frame, and means for preventing sidewise movement of the frame.

6. A kerf-filling attachment for ice-plows comprising a rearwardly tapered plate having its side edges bent downwards at right angles to its body portion, a plate secured to the under face of said first-mentioned plate at the forward end thereof and having depending sides arranged in spaced relation to and parallel with the sides of said first-mentioned plate, and a pair of oppositely-disposed wedge-shaped blocks secured to the sides of said first-mentioned plate to partially close the opening in the rear end thereof.

7. A kerf-filling attachment for ice-plows comprising a rearwardly-tapering plate having its side edges bent downwards at right-angles to its body portion, a plate secured to the under face of said first-mentioned plate at the forward end thereof and having depending sides arranged in spaced relation to and parallel with the sides of said first-mentioned plate, a pair of oppositely-disposed wedge-shaped blocks secured to the sides of said first-mentioned plate, to partially close the opening in the rear end thereof, and a depending member secured to the under face of said first-mentioned plate between said blocks.

8. The combination with an ice-plow, its beam, and a pair of rearwardly extending handles secured to the beam, of a kerf-filling attachment carried by the handles and comprising a rearwardly-tapering frame having depending sides arranged at right-angles to the body-portion thereof, means for holding said frame yieldingly against the surface of the ice, a hook carried by the plow beam, a chain secured at opposite ends to the sides of said frame and adapted for engagement with said hook, and a forwardly extending guide secured to the body portion of said frame and adapted for engagement with said beam, to prevent sidewise movement of the frame.

In testimony whereof, I affix my signature, in presence of two witnesses.

SAMUEL KNECHT.

Witnesses:
EUGENE L. ROSE,
BENJAMIN B. BAUMAN.